(No Model.) 2 Sheets—Sheet 1.
L. A. FENNER.
ROCK SEPARATING APPARATUS FOR MINING SLUICES.
No. 375,808. Patented Jan. 3, 1888.
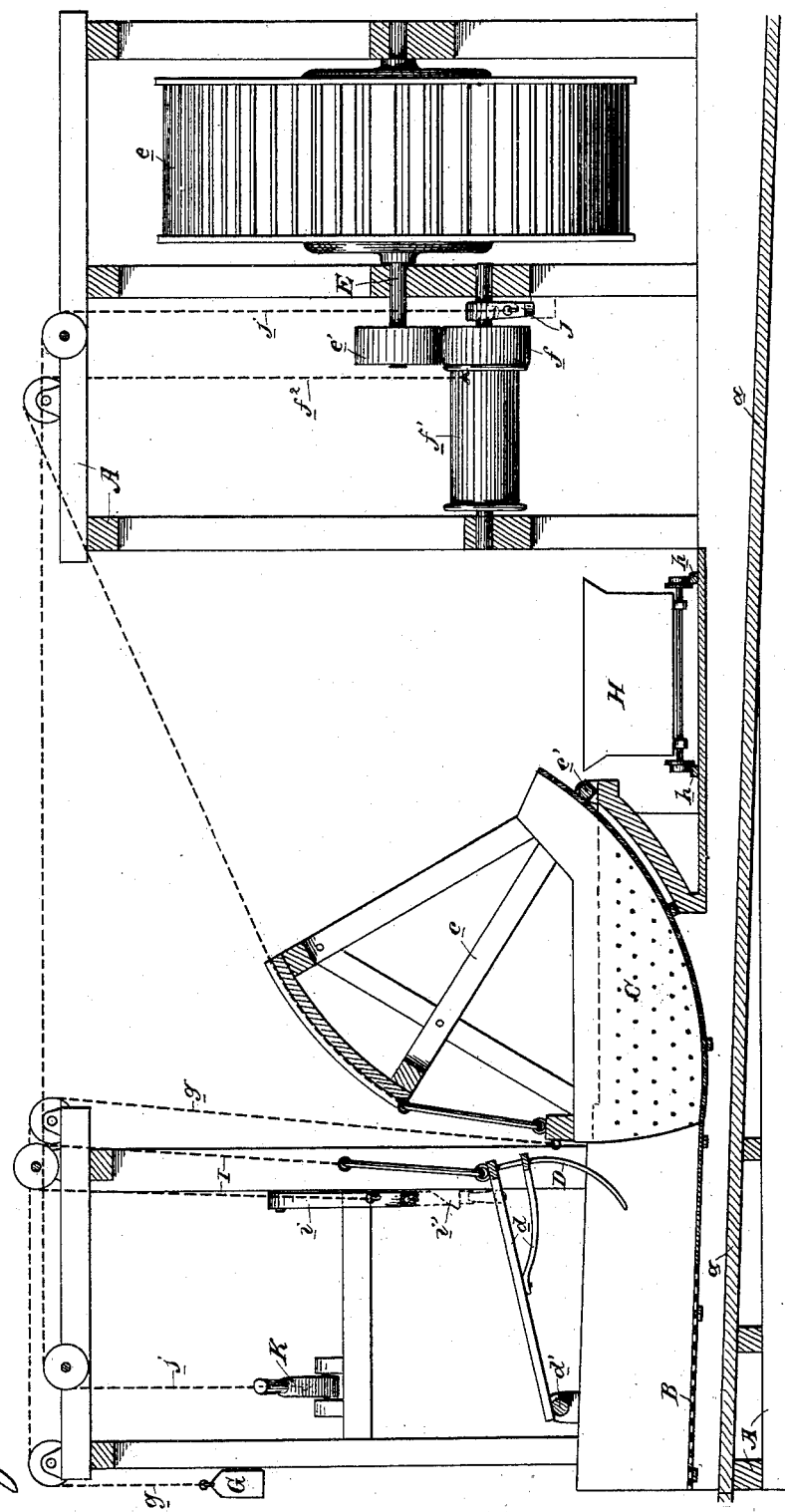

(No Model.) 2 Sheets—Sheet 2.
L. A. FENNER.
ROCK SEPARATING APPARATUS FOR MINING SLUICES.
No. 375,808. Patented Jan. 3, 1888.
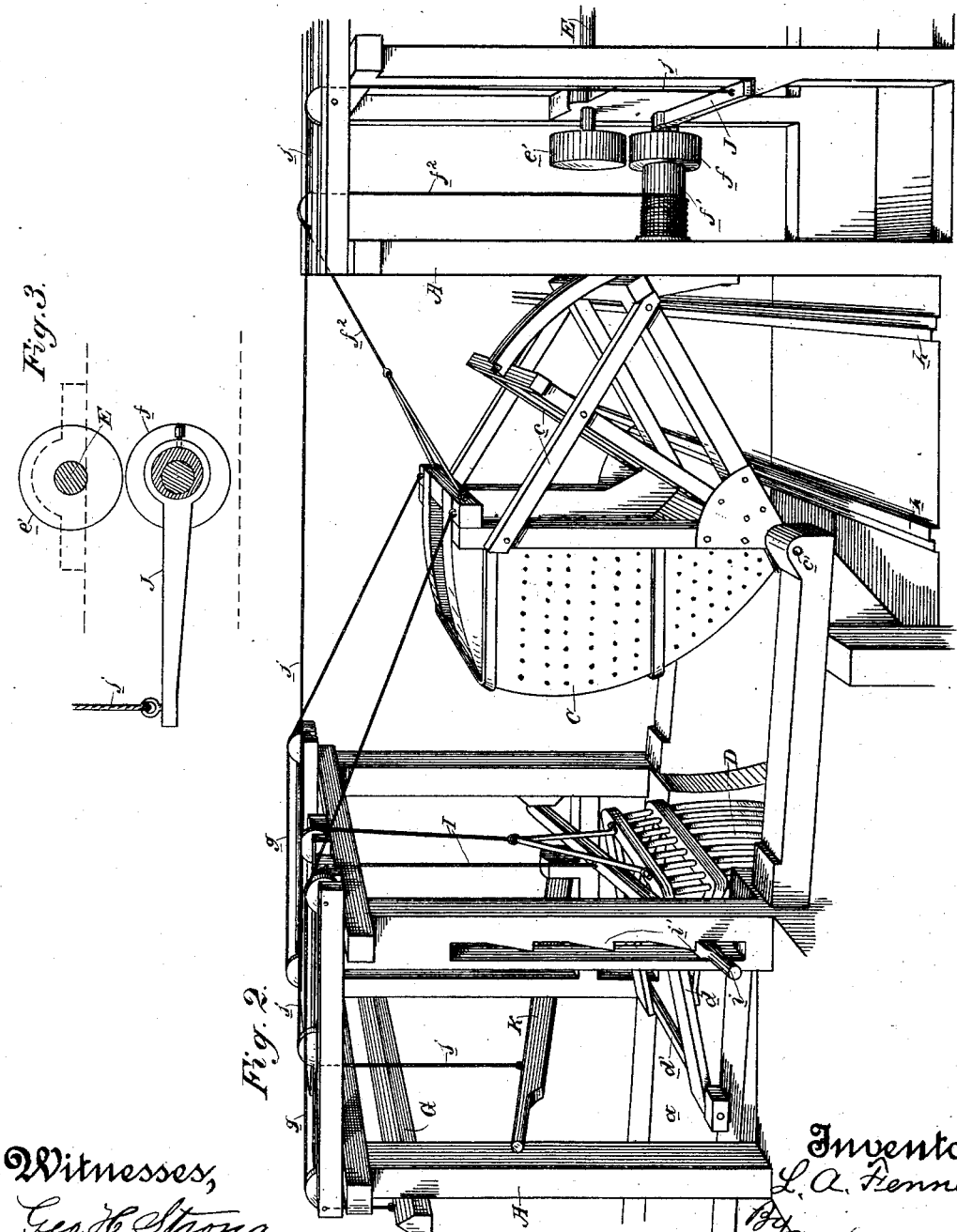
Witnesses,
Geo. H. Strong.
J. H. House.
Inventor
L. A. Fenner
By
Dewey & Co.
att.

UNITED STATES PATENT OFFICE.

LAWRENCE A. FENNER, OF VIRGINIA CITY, MONTANA TERRITORY.

ROCK-SEPARATING APPARATUS FOR MINING-SLUICES.

SPECIFICATION forming part of Letters Patent No. 375,808, dated January 3, 1888.

Application filed April 28, 1887. Serial No. 236,529. (No model.)

*To all whom it may concern:*

Be it known that I, LAWRENCE A. FENNER, of Virginia City, Madison county, Montana Territory, have invented an Improvement in Rock-Separating Apparatus for Mining-Sluices; and I hereby declare the following to be a full, clear, and exact description of the same.

My invention relates to apparatus used in connection with hydraulic mining, in which the material is directed into and carried through a flume.

The object of my invention is to separate the larger rock from the finer material in ground-sluice and hydraulic mining, where want of fall or other conditions make it necessary to keep the heavier material from going into a bed rock-flume.

My invention consists in the constructions and combinations of devices, which I shall hereinafter fully describe and claim.

Referring to the accompanying drawings for a more complete explanation of my invention, Figure 1 is a longitudinal section of my apparatus, some of the parts being in elevation. Fig. 2 is a perspective view showing the grated scoop raised. Fig. 3 is a detail showing the friction-pulleys $e'$ and $f$ and the brake-lever J.

A is a frame-work, in the lower portion of which is formed the short sluice $a$, one end of which may be supposed to be in connection with the ground sluice.

B is a horizontal grating or "grizzly" over the other end of the sluice $a$.

C is a perforated or grated scoop over said sluice and directly behind the grating B. This scoop has a frame, $c$, mounted on a pivotal shaft, $c'$, by which it may turn through an arc in a vertical plane, making a partial revolution, for the purpose of dumping its load.

D is a vertical grating or grizzly, which is located between the horizontal grating and the scoop. This grating is secured to a frame, $d$, having a pivotal shaft, $d'$, whereby it may be raised and lowered about said shaft as a center through an arc in a vertical plane.

E is a shaft on which a suitable motor—such as a water-wheel, $e$—is placed. One end of the shaft carries a friction-pulley, $e'$, which operates on a friction-pulley, $f$, on a winding-drum, $f'$, to which is secured the cable $f^2$, which passes over suitable pulleys, and is connected with the frame of the scoop C.

G is a weight suspended by cables $g$, passing over suitable pulleys on the frame A and connected with the frame of the scoop, by which said scoop is turned to a vertical position, where, by reason of its center of gravity being on its grated side, it gravitates to and is held in its normal position.

H is a car, which is run on a track, $h$, just back of the scoop, and is to receive its load.

The vertical grating or grizzly D is operated by means of the cable I, which passes up over a pulley in the frame-work above and down again to a lever, $i$, which engages a rack, $i'$, to hold said lever in position.

J is a brake-lever for controlling the movement of the winding-drum $f'$. It is operated by means of a cable, $j$, which passes over suitable guide-pulleys to a pivoted lever, K, within reach of the operator.

The operation of the apparatus is as follows: The material is fed through any suitable short flume or sluice, properly graded and arranged, to and upon the horizontal grizzly B, through which a portion of the finer material passes into the sluice $a$ below. The vertical grating D is at this time elevated, so that the passage is clear to the main separator or scoop, through which the remainder of the finer material passes into the sluice below, while all the large rocks are retained. As soon as the scoop has a sufficient load, the lever K is moved, so as to relieve the winding-drum of its brake, thereby allowing the operation of the friction-gearing and the consequent rotation of the drum, which winds up the cable $f^2$. The scoop is thereby drawn over through a partial revolution, so as to discharge its load upon the car. Before this is done, however, the lever $i$ is released from its rack, whereby the vertical grate D is allowed to move down and stop the passage of the larger rocks while the scoop is discharging its load. When the scoop comes back to its normal position, as above described, the vertical grating D is thereupon raised again to position, and the operation continues as before. It will be observed that the weight G is so suspended and connected with the scoop that when the scoop is in a normal position the weight acts against it to assist the main power in dumping it; but when the scoop passes the center the weight acts to bring it back again.

Having thus described my invention, what I claim as new, and desire to secure by Letters Patent, is—

1. An apparatus for separating the larger rocks from the finer material, comprising a horizontal grating, a perforated or grated scoop hinged or pivoted behind the grate, an underlying sluice, and means for dumping the scoop, substantially as described.

2. An apparatus for separating the larger rocks from the finer material, comprising a fixed horizontal grating, a perforated scoop hinged or pivoted behind said grating, means for dumping the scoop, an underlying sluice, and a vertical pivoted grating between the horizontal grating and scoop, substantially as described.

3. The perforated or grated scoop having a frame with a pivotal shaft, whereby it may be oscillated to dump its load, in combination with the means for operating it, consisting of the friction-gearing, the winding-drum, and a cable connected with said drum and with the frame of the scoop, substantially as herein described.

4. In an apparatus for separating rock from finer material, the swinging perforated or grated scoop having a frame with a pivotal shaft, in combination with friction-gearing, a winding-drum, and a cable attached to the drum and to the frame of the scoop, a brake for controlling the movement of the winding-drum, and a lever and connecting cable, substantially as herein described.

5. In an apparatus for separating rocks from finer material, the vertical grating having a frame with a horizontal pivoted shaft, whereby it may be moved through an arc in a vertical plane, in combination with a lever and cable for raising the grate, and a fixed horizontal grating below the vertical grating, substantially as herein described.

6. The swinging perforated or grated scoop having a frame with a pivotal shaft, the friction-gearing, a winding-drum and connecting cable for swinging the scoop to dump its load, a weight and connecting cables for assisting in bringing it back to position, and a brake and lever and connections for controlling the movement of the winding-drum, substantially as herein described.

In witness whereof I have hereunto set my hand.

LAWRENCE A. FENNER.

Witnesses:
GEORGE GOHN,
J. M. KNIGHT.